Aug. 17, 1926.
L. P. SÉBILLE
TIRE CARRIER
Filed April 23, 1921
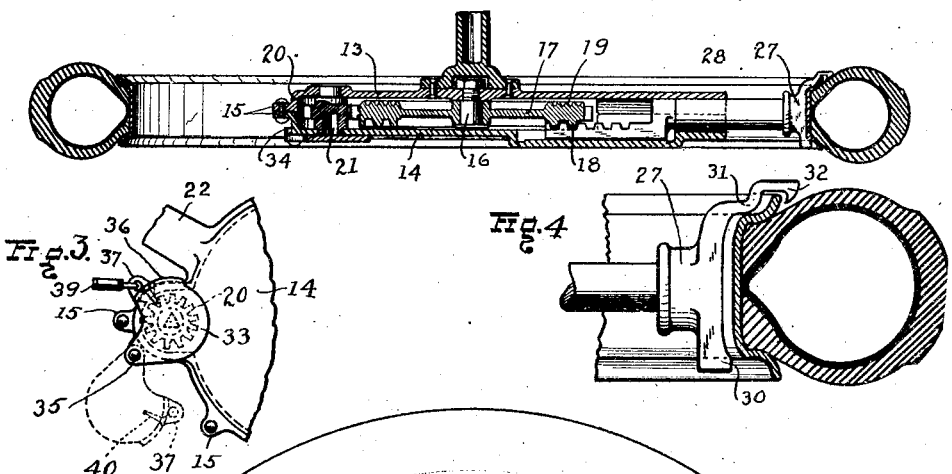
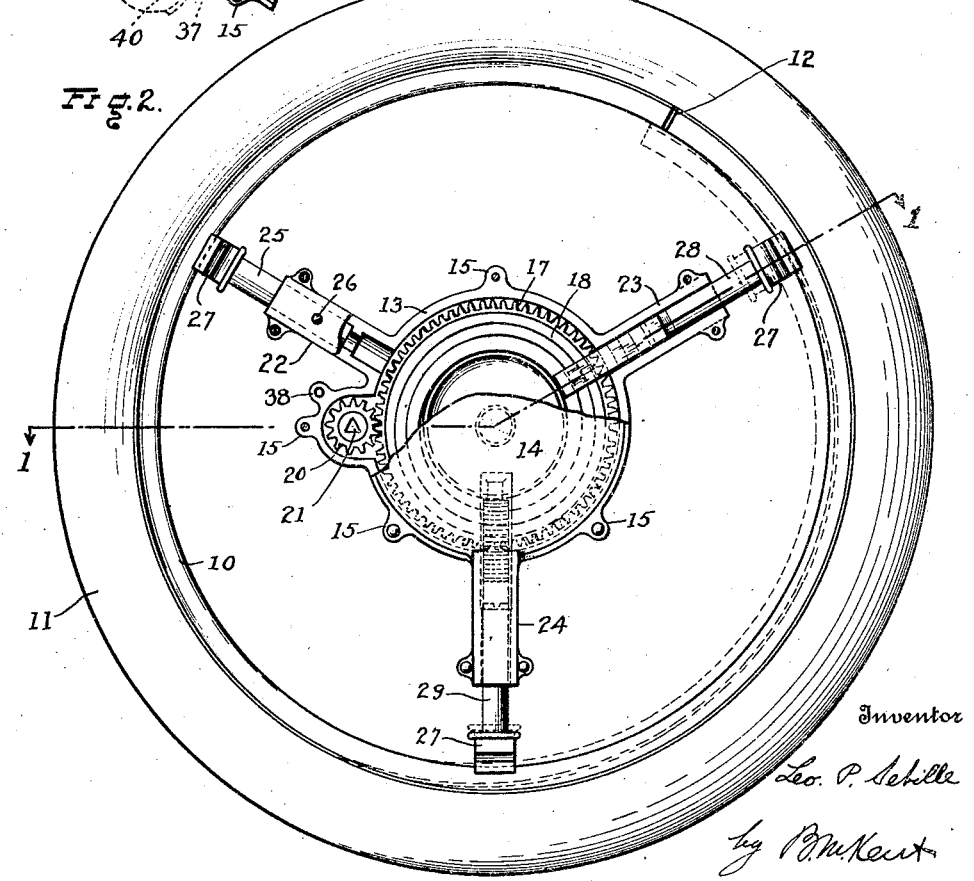

Patented Aug. 17, 1926.

1,596,123

UNITED STATES PATENT OFFICE.

LÉO PAUL SÉBILLE, OF CLEVELAND, OHIO, ASSIGNOR OF ONE-HALF TO BERT M. KENT, OF CLEVELAND, OHIO.

Application filed April 23, 1921. Serial No. 463,769.

TIRE CARRIER.

This invention relates to automobile tire carriers and has for one of its objects the provision of a carrier that will be simple in construction, comparatively inexpensive and of neat substantial appearance.

A further object of the invention is to provide a tire carrier adapted to lock the tire thereon and another object of the invention is to provide a tire carrier which has means whereby the rim of the tire may be readily and conveniently collapsed for the purpose of removing or replacing the tire.

Other objects and the features of novelty of the invention will be apparent from the following description taken in connection with the accompanying drawings, of which:

Figure 1 is a section of a tire carrier with tire and rim thereon, the construction embodying my invention and the section being taken substantially on the line 1—1 of Fig. 2;

Fig. 2 is a side elevation of the same with certain parts broken away;

Fig. 3 is an elevation showing the locking device in detail, and;

Fig. 4 is an enlarged fragment of Fig. 1 with the parts shown in a different relation than in Fig. 1.

Referring to the drawings, 10 indicates a rim on which there is arranged the usual tire 11, the rim in the present instance being provided with a split 12 permitting it to be collapsed for the purpose of removing or replacing the tire.

The tire carrier comprises a central hub formed by two castings 13 and 14 having peripheral lugs 15 which are riveted together. The casting 13 carries at its center a stud 16 on which there is rotatably mounted a gear wheel 17 having on its opposite faces the spirals 18 and 19 which, as will be seen from Fig. 1, have different pitches. A pinion 20 meshes with the teeth of the gear 17 and is suitably supported in the castings 13 and 14, as indicated in Fig. 1. The pinion 20 has a central socket 21 adapted to receive a wrench for rotating the pinion and, in turn, the gear 17.

Projecting from the castings 13 and 14 are the hollow radial arms 22, 23 and 24, preferably spaced symmetrically about the hub. One of the arms, preferably the arm 22, carries an extension 25 which is rigidly secured therein by a rivet 26 or any other suitable means and which carries at its outer end a seat 27 adapted to receive the rim. The arms 23 and 24 have slidably mounted therein the extensions 28 and 29, respectively, the extension 28 having its inner end in engagement with the spiral 18 so as to be moved in either direction by the rotation of the gear 17. In like manner the extension 29 cooperates with the spiral 19 so as to be moved radially thereby. On account of the spirals 18 and 19 having different pitches, it will be understood that the extensions 28 and 29 will move differentially as the gear 17 is rotated, the extension 28 having greater movement than the extension 29 and on this account the split 12 of the rim is arranged between the arms 22 and 23 and spaced a slight distance from the arm 23, as shown, for a purpose to be hereinafter described.

The extensions 28 and 29 each carry a seat 27 for the rim and, from Fig. 4, it will be noted that these seats are each provided at one side with a short projection 30 and at the other side with a relatively long projection 31, having at its outer end a hook or other means 32 adapted to engage the flange of the rim when moved inwardly. The projections 30 and 31 prevent lateral movement of the rim on the parts 27 when the latter are forced outwardly against the rim, the position shown in Fig. 1. When, however, the extensions 28 and 29 are withdrawn slightly from the rim, as shown in Fig. 4, the latter, with its tire, may be removed from the carrier. If the extensions 28 and 29 are drawn inwardly from the position shown in Fig. 4, the hooks 32 will engage with the flange of the rim and collapse the latter, as indicated in dotted lines in Fig. 2. In thus collapsing the rim, that portion adjacent the arm 23 will naturally have a greater movement than that portion adjacent the arm 24 and for this reason I have made the spirals 18 and 19 of different pitches so as to provide the necessary relative movement to collapse the rim.

Referring to Fig. 3, it will be noted that a cover 33 is pivoted to a lug 34 on the casting 14, as indicated at 35 and is provided with an axially extending flange 36 having a radial lug 37 which aligns with a corresponding lug 38 on the casting 13 so as to permit the use of a lock 39 to secure the cover 33 in the full line position indicated in Fig. 3. In this position the cover 33 conceals the socket 21 in the pinion 20 and thus prevents rotation of the latter. The flange 36 carries an inwardly projecting pin or lug 40 which is adapted to enter a tooth space in the pinion 20 and secure the latter against rotation and thereby prevent a movement of the arms 28 and 29 which will release the rim. When the lock 39 is removed the cover 33 may be swung to the dotted line position in Fig. 3 which will permit access to the socket 21 so that the pinion 20 may be rotated by a suitable wrench.

While I have illustrated a construction in which the two extensions 28 and 29 are movable, in some cases it will only be necessary to have one of these extensions movable in order to release the rim or to collapse it sufficiently to permit removal or replacement of the tire. It will also be understood that the seats 27 may be widened, if desired, so as to carry more than one rim, and that the carrier may be mounted on a vehicle in any desired position with its axis horizontal or vertical or at some angular position in between and without regard to which of the arms is uppermost While I have illustrated a common form of transversely split rim and designed seats 27 to accommodate this particular type of transversely split rim, yet it will be understood that various changes may be necessary or desirable in order to adapt the invention to other types of transversely split rims, without departing from the spirit of the invention which is defined in the appended claims.

Having thus described my invention, what I claim is:

1. A tire carrier comprising a supporting hub, a plurality of supporting arms adapted to engage the interior of the rim of the tire to support the same, some of said arms being movable radially and being provided at their ends with means adapted to engage the rim and draw the same inwardly, and a rotary member in said hub having means cooperating with the radially movable arms and adapted to move the same differentially.

2. In a device of the class described, the combination of a hub, a stationary arm on said hub having means at its outer end adapted to engage the rim of a tire and hold the same from outward movement relative thereto, a plurality of arms movable in radial planes which are normal to the plane of the rim and having means at their outer ends to engage the rim of a tire for the purpose of drawing the same inwardly, and means in said hub for actuating said radially movable arms simultaneously and differentially.

3. In a device of the class described, the combination of a hub having a stationary arm and a plurality of radially movable arms projecting therefrom, each of said arms having means at its outer end for engaging the rim of a tire to collapse the same, a rotary member in said hub provided with a spiral device cooperating with one of said arms to move the latter radially, and additional means in said hub whereby another of said arms is moved radially simultaneously with the movement of the last-mentioned arm but differentially with reference thereto.

4. In a device of the class described, the combination of a hub having a stationary arm and two radially movable arms thereon, all radially and symmetrically arranged on said hub and provided with means at their outer ends for engaging the rim of a tire to collapse the same, and means in said hub for actuating said movable arms differentially, comprising a rotary member provided with a spiral device cooperating directly with one of said movable arms.

5. In a device of the class described, the combination of a hub having a stationary arm and two radially movable arms, all radially and symmetrically arranged on said hub and provided with means at their outer ends for engaging the rim of a tire to collapse the same, and rotatable means in said hub provided with spiral devices of different pitches each cooperating with one of said arms to actuate it to collapse said rim.

In testimony whereof I affix my signature.

LÉO PAUL SÉBILLE.